United States Patent Office 3,473,296
Patented Oct. 21, 1969

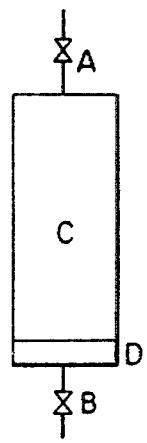
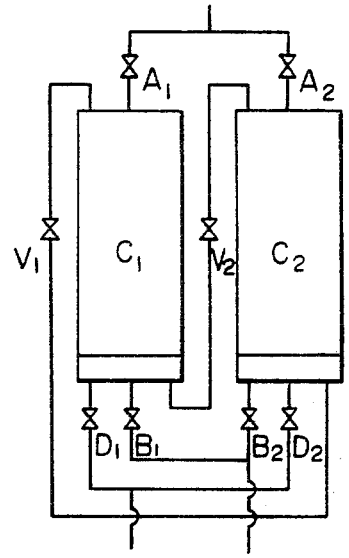
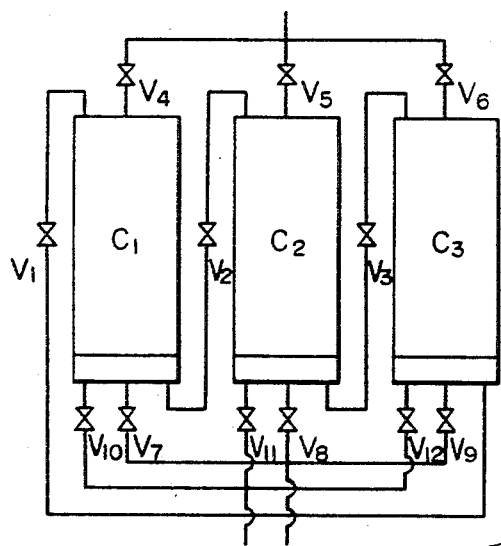

3,473,296
ADSORPTION PROCESS FOR GAS SEPARATION
Takaaki Tamura, 1-6-814 Toyamacho, Shinjuku-ku,
Tokyo, Japan
Filed Nov. 29, 1966, Ser. No. 597,630
Claims priority, application Japan, Nov. 30, 1965,
40/73,151
Int. Cl. B01d 53/02, 53/04
U.S. Cl. 55—68                                                7 Claims

ABSTRACT OF THE DISCLOSURE

An adsorption process for separating at least one gas component, for example nitrogen, from a gas mixture by at least one cyclic process, the process comprising providing an adsorbent which more readily adsorbs the one gas component and placing it in an adsorption column, releasing gas adsorbed by said adsorbent in said column, exposing the adsorbent for the one gas component to a gas mixture, for example air, containing said gas component to be separated, so that the gas component is separated from the gas mixture due to the more ready adsorption thereof by the adsorbent, and introducing into the column after the desorption step and before the adsorption step a gas consisting essentially of a gas component having the same composition as that of a gas component of said mixture which is less readily adsorbable by the adsorbent, such as oxygen.

BACKGROUND OF THE INVENTION

Field of the invention

The present invention relates to an improved adsorption process for gas separation and more particularly to a process for separating each gas component at a high purity and with a high efficiency by means of an adsorbent. Even more particularly, the invention relates to an improved process for recovering high-purity oxygen and/or nitrogen from air by means of a specific naturally-occurring inorganic material.

DESCRIPTION OF THE PRIOR ART

It is well known as disclosed in, e.g., U.S. Patent 2,944,627, and Japanese Patents 35/14,529 and 38/25,-969 that a gas separation process can be conducted by a cyclic adsorption process wherein an adsorbent is repeatedly saturated and desorbed of one or more components of a gas mixture. These known processes have advantages such as that no heating and cooling are necessary and, in particular, in the case of separating oxygen and/or nitrogen from air the vast power required for operating, for example, an air liquefaction system is unnecessary.

However, since such known processes consist mainly of the combination of an adsorption step and a desorption step, the change of gas composition in the gas fraction recovered when changing from adsorption to desorption is not sharp, that is, the volume of the impure gas fraction withdrawn when changing from the adsorption step to the desorption step is quite large, which results in reducing the purities of the recovered gas components and also lowering the recovery yield or efficiency.

SUMMARY OF THE INVENTION

Therefore, an object of the present invention is to provide an improved adsorption process for separating pure gas components with a good efficiency from a gas mixture containing the gas components.

Another object of the present invention is to provide an improved adsorption process for recovering oxygen and/or nitrogen from air by using a specific naturally-occurring inorganic material as an adsorbent, the oxygen and/or nitrogen having a purity such that they may be utilized as a source of industrial oxygen or nitrogen without the necessity of further refining treatment.

The inventor has found that the above-mentioned objects can be achieved by inserting between a desorption step for removing or recovering the gas component adsorbed in an adsorbent in an adsorption column an adsorption step of introducing into the adsorption column a gas mixture containing a readily adsorbed gas component and a less readily adsorbed gas component for separating the latter from the former, a novel step of introducing into the adsorption column containing thus desorbed adsorbent a gas consisting of the gas component which is the same as the less readily adsorbed gas component until the inside pressure of the column reaches a definite value (hereinafter, the third step is called the "feedback step" or "feedback procedure").

The inventor has further found that in the adsorption process including the feedback step, high-purity oxygen or nitrogen is recovered from air by using a specific natural inorganic material or a specific rock which will be described below in detail.

BRIEF DESCRIPTION OF THE DRAWINGS

The invention will now be explained with reference to the accompanying drawings, in which:

FIG. 1 is a schematic view showing the principle of the present invention;

FIG. 2 is a schematic view showing an embodiment of an apparatus for carrying out the method of this invention wherein two adsorption units are employed;

FIG. 3 is a schematic view showing another embodiment of an apparatus for carrying out the method of this invention wherein three adsorption units are employed;

DESCRIPTION OF THE PREFERRED EMBODIMENTS

Figure 4:
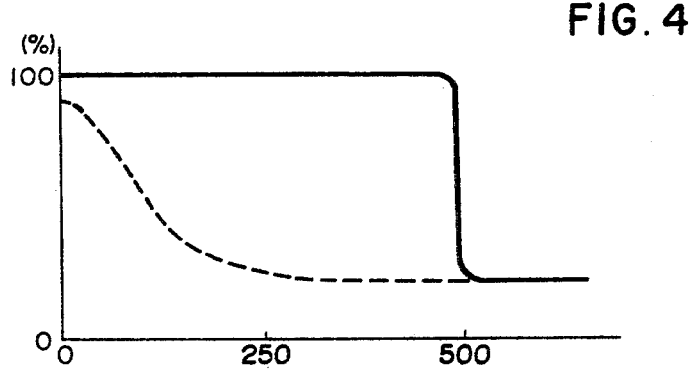
FIG. 4 is a graph showing the gas components contained in the gas fraction recovered during the adsorption development step when separating oxygen from air using the single adsorption unit as shown in FIG. 1 and an adsorbent.

Referring, now, to FIG. 1, there is shown an adsorption unit for explaining the principle of this invention. The adsorption unit consists of a column containing an adsorbent C and having an inlet A for a gas mixture and an outlet B for recovering a definite gas component and the inlet and the outlet each is equipped with a valve. The adsorbent is selected depending upon the kind of gas to be separated.

In the first desorption step, the valve of the inlet is closed and the adsorption column is evacuated through the outlet B by means of a vacuum pump (not shown) or the like to remove gaseous components adsorbed by the adsorbent and present in the column as completely as possible.

In the feedback step, a gas consisting of only the same gas as the less readily adsorbed gas component in a gas mixture is introduced into the adsorption column until it reaches a definite pressure.

In the adsorption step, a gas mixture containing the less readily adsorbed gas and a readily adsorbed gas is introduced into the adsorption column through the inlet A after opening the valve of the outlet until the readily adsorbed gas component appears in the outlet D of the adsorption column, during which procedure the feedback gas and the less readily adsorbed gas component are recovered from the system through the outlet B.

As mentioned above, a vacuum pump is usually employed for the desorption step of this invention but when the feedback step and the adsorption step are conducted at a high pressure, the desorbing procedure can be conducted by opening the system into the atmosphere. Further, the adsorption procedure and the feedback procedure are preferably carried out in the same column but may be carried out in multiple columns if necessary.

After the readily absorbed gas component reaches the outlet end D of the adsorption column, the introduction of the feed gas mixture is stopped and after closing the valve of the inlet, the desorption procedure is repeated. In the desorption procedure, the readily adsorbed gas component may of course be recovered. The detection of the fact that the readily adsorbed gas component reaches the outlet end D of the column can be by means of a gas analysis but is preferably by means of a temperature measurement. That is, the above phenomenon occurs after the adsorbent in the column is substantially saturated by the readily adsorbed gas component in the feed gas mixture, at which time there occurs a temperature change owing to the change in the heat of adsorption in the system and hence by measuring the temperature change of the adsorbent by a suitable means the above fact can be confirmed. The temperature measuring system is particularly suitable for a system for automatically carrying out the method of tthe invention as shown in FIG. 2 and FIG. 3.

When a single adsorption column is employed as in FIG. 1, the time of stopping the introduction of the feed gas mixture can be suitably selected. That is, when a high-purity product gas is required, the gas fraction from the outlet B of the column is stored in a gas tank for the high-purity gas immediately before the readily adsorbed gas component appears at the outlet end of the column and thereafter the gas friction from the outlet is stored in a gas tank for the low-purity gas until the concentration of the less readily adsorbed gas component in the gas fraction from the outlet becomes equal to that of the feed gas at the inlet.

The velocity of the feed gas introduced into the system during the adsorption step is influenced by the kind of feed gas, the kind of adsorbent, the operating temperature and the grain size of the adsorbent but it is preferable to pre-select experimentally the gas velocity capable of producing a condition wherein the curve showing the relation between the concentration of the less readily adsorbed gas component and the amount of the recovered gas changes most sharply (hereinafter, such a curve is called a "concentration curve").

By adopting the feedback step according to the present invention in the adsorption process, the concentration curve breaks very sharply, which is an important feature of the instant invention.

Thus, the feedback procedure is the most important feature of this invention, and in the first or initial feedback procedure in the practice of the process of this invention, a pure feedback gas from an outer source is utilized but thereafter the high-purity gas recovered in the adsorption step of the present process can be utilized in the latter feedback steps.

The invention has been described with respect to the use of a single adsorption unit but the invention is also applicable more profitably to the case of using two or more adsorption units as shown in FIG. 2 and FIG. 3.

In FIG. 2 wherein an embodiment for carrying out the method of this invention employing two adsorption units is illustrated, gas inlet valves $A_1$ and $A_2$ are provided at the gas inlets of the adsorption columns $C_1$ and $C_2$ respectively and gas outlet valves $B_1$ and $B_2$ and gas discharging valves $D_1$ and $D_2$ connected to vacuum pumps (not shown) are provided at the gas outlets of the columns $C_1$ and $C_2$ respectively. The inlet of the first adsorption column $C_1$ is connected to the outlet of the second adsorption column $C_2$ by means of a conduit through a valve $V_1$ and the outlet of the first column is connected to the inlet of the second column by means of a conduit through a valve $V_2$.

In practice, the desorption procedure is carried out in the adsorption column $C_1$ by opening the valve $D_1$ while closing all other valves and applying suction to column $C_1$ by means of the vacuum pump (not shown) connected to valve $D_1$, and then after closing the valve $D_1$ and opening the valve $B_1$ a gas having the same composition as the less readily adsorbed gas component in a gas mixture to be processed is introduced through the opened valve $B_1$ into the first column until the pressure in the column reaches a definite value. Thereafter, the valve $A_1$ is opened and a feed gas mixture containing the less readily adsorbed gas component together with a readily adsorbed gas component is fed into the first column through the valve $A_1$, whereby the feedback gas and the less readily adsorbed gas in the feed gas mixture are discharged through valve $B_1$ and can be stored in a suitable gas reservoir. During the adsorption procedure in the first column, the second adsorption column $C_2$ is subjected to the desorption procedure by evacuation through the valve $D_2$ which is also connected to a vacuum pump (not shown) and then the gas having the less readily adsorbed gas component is introduced into the second column through the valve $B_2$ as in the case of the first column. Thereafter, immediately before the readily adsorbed gas component in the feed gas mixture passes through the valve $B_1$ (this may be confirmed by measuring the temperature change in the column as explained before), the valve $V_2$ and valve $B_2$ are opened and the valve $B_1$ is closed simultaneously. Then after the concentration of the less readily adsorbed gas component in the gas fraction passing through the valve $B_1$ becomes the same as that in the feed gas mixture, the valve $A_2$ is opened and the valves $V_2$ and $V_1$ are closed. By this procedure, the whole gas fraction having an intermediate concentration of the less readily adsorbed gas component from a time just before it reaches the valve $B_1$ to the instant when it passes through the valve is subjected to the adsorption treatment in the second column $C_2$ and thereafter is discharged through the valve $B_2$. Accordingly, it is clear that the product gas can be maintained at a constant high purity during the operation and also the separation procedure can be conducted continuously with a high efficiency.

Thus, when the second adsorption column is in the adsorption step, the first column $C_1$ is subjected to the desorption procedure by opening the valve $D_1$ and then after closing the valve $D_1$ and opening the valve $B_1$, the first column is subjected to the feedback procedure again. Thereafter, just before the gas fraction containing the readily adsorbed gas component reaches the valve $B_2$, the valves $V_1$ and $B_1$ are opened and the valve $B_2$ is closed simultaneously and then when the comncentration of the less readily adsorbed gas component in the gas fraction at the valve $B_2$ becomes the same as that in the gas mixture at the valve $A_2$, the valve $A_1$ is opened and the valves $V_1$ and $A_2$ are closed, whereby the whole cycle of the adsorption process is finished while separating continuously the feed gas mixture and the system is returned to the initial state. By repeating the procedure, the separation of a gas mixture can be conducted effectively. It will further be easily understood to those skilled in the art that the above-mentioned process can be carried out automatically by utilizing the temperature changes caused by the changes in the heat of adsorption in the adsorption units in each step.

In FIG. 3 is illustrated another embodiment of an apparatus for carrying out the method of the invention by using three adsorption units according to the process of this invention, in which valves $V_4$, $V_5$ and $V_6$ and valves $V_7$, $V_8$ and $V_9$ are provided to feed gas inlets and product gas outlets of adsorption columns $C_1$, $C_2$ and $C_3$ respectively. Valves $V_{10}$, $V_{11}$ and $V_{12}$ are connected to the outlets of the columns for effecting the desorption procedures. The columns are connected to each other by means of conduits through valves $V_1$, $V_2$ and $V_3$. It will be clear that a product gas having a constant high purity can be separated continuously from a feed gas mixture in the same manner as in the case of using two adsorption units by operating these valves as shown in the following table:

| Operation cycle | Operation states of three colums in each cycle | | State of each valve | | | | | | | | | | | |
|---|---|---|---|---|---|---|---|---|---|---|---|---|---|---|
| | | | $V_1$ | $V_2$ | $V_3$ | $V_4$ | $V_5$ | $V_6$ | $V_7$ | $V_8$ | $V_9$ | $V_{10}$ | $V_{11}$ | $V_{12}$ |
| No. 1 | $C_1$ | ad.→ibp. | − | − | − | + | − | − | + | + | − | − | − | − |
| | $C_2$ | fb. | | | | | | | | | | | | |
| | $C_3$ | de. | | | | | | | | | | | | |
| No. 2 | $C_1$ | ibp.→pf. | − | + | − | + | − | − | − | + | − | − | − | + |
| | $C_2$ | ad. | | | | | | | | | | | | |
| | $C_3$ | de. | | | | | | | | | | | | |
| No. 3 | $C_1$ | de. | − | − | − | − | + | − | − | + | + | + | − | − |
| | $C_2$ | ad.→ihp. | | | | | | | | | | | | |
| | $C_3$ | fb. | | | | | | | | | | | | |
| No. 4 | $C_1$ | de. | − | − | + | − | + | − | − | − | + | + | − | − |
| | $C_2$ | ihp.→pf. | | | | | | | | | | | | |
| | $C_3$ | ad. | | | | | | | | | | | | |
| No. 5 | $C_1$ | fb. | − | − | − | − | − | + | + | − | + | − | + | − |
| | $C_2$ | de. | | | | | | | | | | | | |
| | $C_3$ | ad.→ibp. | | | | | | | | | | | | |
| No. 6 | $C_1$ | ad. | + | − | − | − | − | + | + | − | − | − | + | − |
| | $C_2$ | de. | | | | | | | | | | | | |
| | $C_3$ | ibp.→pf. | | | | | | | | | | | | | wherein (+) indicates that the valve is opened, (−) indicates that the valve is closed, (ad.) indicates a condition in which the adsorption column is in the adsorption step, (fb.) indicates that the column is in the feedback step, (de.) indicates that the column is in the desorption step, (ihp.) indicates that the column is in the condition before the impure gas fraction is passed through the outlet valve of the column, and (pf.) indicates that the column is in the condition in which the passing of the impure gas fraction through the outlet valve is finished.

The above-mentioned process is applicable to the separation of various gas mixtures and in particular by the process of this invention high-purity oxygen of above 99% in purity can be separated from air by using as the adsorbent a molecular sieve or zeolite and in addition oxygen having higher purity can be obtained by using a specific adsorbent described below.

The adsorbent which can be more effectively used in the process of this invention when separating high-purity oxygen from air is a naturally occurring rock material mainly consisting of $SiO_2$, $Al_2O_3$ and $H_2O$, containing 1–10% by weight of the total amount of $K_2O$, $Na_2O$ and $CaO$, and having an X-ray diffraction pattern shown in the following Table I or Table II.

TABLE I

| A. | 10 $I/I_0$ |
|---|---|
| 13.9–0.1 | 2 |
| 9.1–01 | 4 |
| 6.6–0.1 | 4 |
| 6.5–0.1 | 2 |
| 6.1–0.1 | 2 |
| 5.83–0.05 | 2 |
| 4.55–0.05 | 2 |
| 4.30–0.10 | 0–5 |
| 4.26–0.10 | 0–2 |
| 4.08–0.10 | 0–4 |
| 4.05–0.10 | 0–6 |
| 4.01–0.05 | 7 |
| 3.85–0.03 | 2 |
| 3.81–0.10 | 0–4 |
| 3.77–0.05 | 1 |
| 3.48–0.03 | 10 |
| 3.40–0.03 | 5 |
| 3.35–0.10 | 0–8 |
| 3.23–0.03 | 6 |
| 3.10–0.03 | 0–1 |
| 2.90–0.03 | 3 |
| 2.85–0.03 | 0–2 |
| 2.71–0.03 | 1 |
| 2.58–0.03 | 1 |
| 2.53–0.03 | 2 |
| 2.49–0.03 | 0–4 |
| 2.47–0.03 | 0–3 |
| 2.45–0.03 | 0–2 |
| 2.04–0.03 | 2 |
| 1.96–0.03 | 1 |
| 1.88–0.02 | 1 |
| 1.82–0.02 | 1 |
| 1.82–0.02 | 0–2 |
| 1.79–0.02 | 1 |
| 1.53–0.02 | 1 |

TABLE II

| A. | 10 $I/I_0$ |
|---|---|
| 9.10–0.1 | 7 |
| 7.99–0.1 | 4 |
| 6.82–0.1 | 2 |
| 5.85–0.08 | 5 |
| 5.29–0.08 | 2 |
| 5.12–0.05 | 3 |
| 4.67–0.05 | 2 |
| 4.30–0.10 | 0–5 |
| 4.26–0.10 | 0–2 |
| 4.08–0.10 | 0–4 |
| 4.05–0.10 | 0–6 |
| 3.98–0.05 | 10 |
| 3.85–0.05 | 2 |
| 3.81–0.10 | 0–4 |
| 3.77–0.05 | 2 |
| 3.47–0.03 | 7 |
| 3.34–0.10 | 0–8 |
| 3.35–0.03 | 5 |
| 3.22–0.03 | |
| 3.18–0.03 | 4 |
| 3.15–0.03 | 4 |
| 2.99–0.03 | 0–1 |
| 2.98–0.03 | 4 |
| 2.89–0.03 | 4 |
| 2.85–0.03 | 0–2 |
| 2.81–0.03 | 3 |
| 2.74–0.03 | 1 |
| 2.53–0.02 | 2 |
| 2.49–0.03 | 0–4 |

TABLE II.—Continued

| A. | 10 I/I₀ |
|---|---|
| 2.47–0.03 | 0–3 |
| 2.46–0.02 | 2 |
| 2.45–0.03 | 0–2 |
| 2.02–0.02 | 0.5 |
| 1.95–0.02 | 0.05 |
| 1.87–0.02 | 0.5 |
| 1.81–0.02 | 0–2 |
| 1.72–0.02 | 0.5 |

The values of the position of the X-ray diffraction pattern and the specific intensity 10 I/I₀ may be varied slightly depending upon the apparatus used for measuring, the humidity and temperature during measuring, and the manner of placing of the crystals, but such variation is not substantial for defining the naturally occurring inorganic material.

The inorganic material defined as in Table I occurs mainly in the Tohoku district and the Chugoku district in Japan and the inorganic material as shown in Table II occurs in the Tohoku district and the Kyushu district. The rock material is ground into particles of 10–50 mesh and thereafter subjected to a dehydration treatment by heating to remove the water of crystallization. The dehydration is generally conducted by heating it to 350–700° C., preferably to 400–650° C.

The invention will be explained by the following examples.

Example 1

A rock material having the following chemical composition: Component—$SiO_2$, $Al_2O_3$, MgO, $Na_2O$, $Fe_2O_3$, CaO, $K_2O$; ignition loss weight percent—66.68, 11.30, 1.14, 0.43, 0.89, 1.86, 4.25, 14.01, and having an X-ray diffraction pattern as shown in Table II was ground into 20–30 mesh and 55.6 g. of thus ground rock was placed in a vertical pipe of 1.2 cm. in diameter and 72 cm. in length and having valves at the top and the bottom of the pipe. The dehydration of the rock material was conducted by heating it about 600° C. and thereafter the rock material was allowed to cool to room temperature in the pipe at a pressure of 1 mm. Hg gauge.

Thereafter, pure oxygen of 99.9% purity was introduced into the pipe until the inside pressure reached atmospheric pressure. The volume of the required oxygen was 352 ml. Then, the upper valve was opened and slightly compressed air was, after being dried and after having carbon dioxide removed, introduced into the pipe at a velocity of 200 ml./min. and at the same time the lower valve was opened to withdraw the inside gas. By this procedure, about 480 ml. of pure oxygen having 99.9% purity was recovered including 352 ml. of the pure oxygen used for the feedback step. Thereafter, during the next 15 ml. of the discharged gas, the purity of the oxygen was suddenly decreased to about that of air.

On the other hand, when the same air was introduced into the thus evacuated pipe containing the rock material without applying the feedback procedure, the average oxygen content of the recovered gas having the same volume from the outlet of the pipe was about 40% and the oxygen purity in the initially withdraw gas fraction was less than 85%.

The same procedure according to this invention was also conducted by using a molecular sieve 5 A. of 20–30 mesh in grain size and markedly effective results were obtained as compared with the same procedure but without applying the feedback procedure according to the invention.

The concentration curve of the example is shown in FIG. 4 which shows the relation between the concentration of oxygen (by volume percent) at the outlet end of the pipe and the volume (ml.) of the recovered gas. The curve shown by the dotted line is for the case where no feedback procedure was used and the curve shown by the solid line is for the case where the feedback procedure was used.

Example 2

Figure 5:
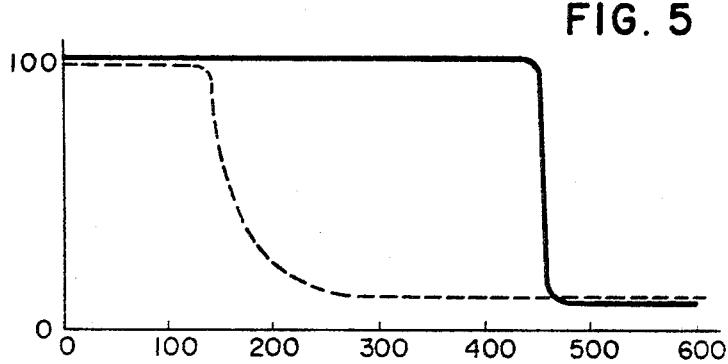
FIG. 5 is a graph showing the gas components contained in the gas fraction recovered during the adsorption development step when separating a methane-ethylene gas mixture using silica gel as the adsorbent.

A vertical column of 1.2 cm. diameter and 72 cm. in length was filled with 64.8 g. of silica gel and the column was evacuated until the inside pressure reached 1 mm. Hg gauge. Thereafter, while maintaining the temperature of the system at 20° C., a methane gas was introduced into the column until the inside pressure reached atmospheric pressure. The volume of the methane gas required in the step was 288 ml. Then, a slightly compressed gas mixture of methane and ethane (12% by volume of methane) was introduced from the top into the column at a velocity of 300 ml./min. and at the same time the lower valve was opened to discharge the inside gas. The concentration curve for the gas fraction at the outlet end of the column is shown in FIG. 5 by the solid line whereas, the same procedure was repeated without using the feedback procedure and the concentration curve of this case is shown in the same figure by the dotted line. From the curve, it will be understood that the thus recovered methane gas has a high purity as compared with that of the case when no feedback procedure was used.

Example 3

Figure 6:
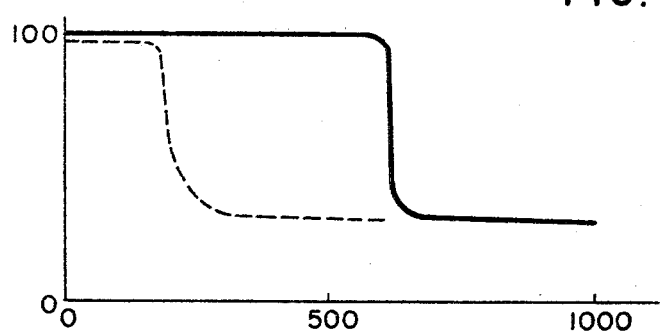
FIG. 6 is a graph showing the gas components contained in the gas fraction recovered during the adsorption development step when separating a nitrogen-methane gas mixture using activated carbon as the adsorbent.

The same column as in Example 2 was filled with 46.8 g. of coconut activated carbon. After evacuating the column until the inside pressure reached 1 mm. Hg gauge, a nitrogen gas was introduced into the column until the inside pressure reached atmospheric pressure. In the procedure, 402 ml. of the nitrogen gas was required. Thereafter, a slightly compressed gas mixture of nitrogen and methane (30.2% by volume of nitrogen) was introduced into the column at a velocity of 250 ml./min. The concentration curve of the gas recovered at the outlet is shown in FIG. 6 by the solid line while the corresponding curve when no feedback procedure was used is shown by the dotted line. From the results, it will be clear that high-purity nitrogen was recovered as compared with the case when no feedback procedure was used.

What is claimed is:

1. A cyclic adsorption process for separating oxygen and nitrogen from air which comprises (1) evacuating an adsorption column containing an adsorbent selective for nitrogen to remove gases present in the column, (2) introducing an oxygen-rich gas having an oxygen content higher than air into the column until the pressure reached is about atmospheric pressure, then (3) flowing air through the column to adsorb nitrogen and simultaneously discharge and recover an oxygen-rich gas until the flow gas at the outlet end of the gas column is substantially the same as that of the air introduced, and (4) repeating the above procedures.

2. The adsorption process as claimed in claim 1 wherein said step of providing the adsorbent comprises providing a naturally occurring inorganic rock material mainly comprising $SiO_2$, $Al_2O_3$ and $H_2$, containing about 1–10% by weight of $K_2O$, $Na_2O$, and CaO, and having the X-ray diffraction pattern shown in Table I in this specification.

3. The adsorption process as claimed in claim 2 wherein said step of providing the adsorbent comprises grinding said naturally occurring inorganic rock material and dehydrating it by heating to 350–700° C.

4. The adsorption process as claimed in claim 2 in which said heating is to 400–650° C.

5. The adsorption process as claimed in claim 1 in which two cyclic processes are used, and the further steps of sensing the temperature of the oxygen-rich gas component at the output end of the adsorbent of the first cyclic process, and when said temperature increases to indicate that the adsorbent is about saturated, feeding the last portion of the oxygen-rich gas component from the first cyclic process over the adsorbent for the second cyclic process, and feeding the last portion of the oxygen-rich gas component from the seond cyclic process over the adsorbent for the first cyclic process when the same point in the time cycle of the second cyclic process is reached.

6. A process in accordance with claim 1 in which the step of introducing the oxygen-rich gas is omitted from the first cycle, and the oxygen-rich effluent gas collected from the nitrogen adsorption step in the first cycle is fed back into the adsorption column in a subsequent cycle before steps (1) and (3) therein.

7. The adsorption process as claimed in claim 1 wherein said step of providing the adsorbent comprises providing a naturally occurring inorganic rock material mainly comprising $SiO_2$, $Al_2O_3$ and $H_2O$, containing about 1–10% by weight of $K_2O$, $Na_2O$, and $CaO$, and having the X-ray diffraction pattern shown in Table II in this specification.

References Cited
UNITED STATES PATENTS

| | | | |
|---|---|---|---|
| 2,882,244 | 4/1959 | Milton | 55—75 X |
| 2,962,355 | 11/1960 | Breck | 55—75 X |
| 2,963,519 | 12/1960 | Kasperik et al. | 55—75 X |
| 3,061,992 | 11/1962 | Russell | 55—75 X |
| 3,221,476 | 12/1965 | Meyer | 55—75 X |
| 3,313,091 | 4/1967 | Berlin | 55—75 X |

JAMES L. DECESARE, Primary Examiner.

U.S. Cl. X.R.

55—75.